United States Patent
Mauvernay et al.

(10) Patent No.: US 8,286,395 B2
(45) Date of Patent: Oct. 16, 2012

(54) GLAZING PROVIDED WITH A STACK OF THIN LAYERS

(75) Inventors: Bruno Mauvernay, Paris (FR); Veronique Rondeau, Asnieres sur Seine (FR); Sylvain Belliot, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/993,173

(22) PCT Filed: May 13, 2009

(86) PCT No.: PCT/FR2009/050881
§ 371 (c)(1),
(2), (4) Date: Feb. 11, 2011

(87) PCT Pub. No.: WO2009/150343
PCT Pub. Date: Dec. 17, 2009

(65) Prior Publication Data
US 2011/0146172 A1   Jun. 23, 2011

(30) Foreign Application Priority Data
May 19, 2008 (FR) ..................... 08 53222

(51) Int. Cl.
*B32B 17/06* (2006.01)
(52) U.S. Cl. ..................... 52/204.5; 428/432
(58) Field of Classification Search .......... 52/204.5; 428/432, 426, 428, 434, 446, 448, 697, 698, 428/701, 699, 702
See application file for complete search history.

(56) References Cited

U.S. PATENT DOCUMENTS

| | | | |
|---|---|---|---|
| 5,965,246 A * | 10/1999 | Guiselin et al. | 428/212 |
| 6,475,626 B1 * | 11/2002 | Stachowiak | 428/428 |
| 6,495,263 B2 * | 12/2002 | Stachowiak | 428/428 |
| 6,524,714 B1 * | 2/2003 | Neuman et al. | 428/428 |
| 6,558,800 B1 * | 5/2003 | Stachowiak | 428/426 |
| 6,677,063 B2 * | 1/2004 | Finley | 428/701 |
| 7,323,249 B2 * | 1/2008 | Athey et al. | 428/432 |
| 7,659,002 B2 * | 2/2010 | Coster et al. | 428/432 |
| 7,901,781 B2 * | 3/2011 | Maschwitz et al. | 428/432 |
| 8,147,969 B2 * | 4/2012 | LaBrousse et al. | 428/426 |
| 2002/0192473 A1 * | 12/2002 | Gentilhomme et al. | 428/432 |
| 2003/0235720 A1 * | 12/2003 | Athey et al. | 428/702 |
| 2004/0009256 A1 * | 1/2004 | Voyatzakis et al. | 425/394 |
| 2004/0137234 A1 | 7/2004 | Stachowiak | |
| 2005/0079369 A1 | 4/2005 | Stachowiak | |
| 2007/0104965 A1 * | 5/2007 | Labrousse et al. | 428/432 |
| 2007/0204949 A1 * | 9/2007 | Labrousse et al. | 156/109 |
| 2007/0224404 A1 * | 9/2007 | Finley et al. | 428/220 |
| 2007/0281171 A1 * | 12/2007 | Coster et al. | 428/432 |
| 2008/0248291 A1 * | 10/2008 | Athey et al. | 428/333 |
| 2009/0176086 A1 * | 7/2009 | Martin et al. | 428/332 |
| 2010/0062245 A1 * | 3/2010 | Martin et al. | 428/336 |
| 2012/0107587 A1 * | 5/2012 | Martin et al. | 428/216 |

FOREIGN PATENT DOCUMENTS

WO   WO 01/21540 A1   3/2001

OTHER PUBLICATIONS

International Search Report issued Dec. 16, 2009 in PCT/FR2009/050881.

* cited by examiner

*Primary Examiner* — Mark Wendell
(74) *Attorney, Agent, or Firm* — Oblon, Spivak, McClelland, Maier & Neustadt, L.L.P.

(57) ABSTRACT

A transparent substrate having a glazing function, provided with a thin-film multi-layer coating, which acts on solar radiation, applicable, for example, in the architectural or automotive fields. The multilayer coating comprises at least two absorbent functional layers each flanked by two transparent layers comprising a dielectric material. Preferably, the functional layers are based on a metal belonging to the group consisting of: niobium, tantalum, molybdenum and zirconium, and the metal or at least one of the functional layers may be partially or entirely nitrided.

23 Claims, No Drawings

GLAZING PROVIDED WITH A STACK OF THIN LAYERS

CROSS REFERENCE TO RELATED APPLICATION

This application is a 371 of PCT/FR2009/050881, filed on May 13, 2009, and claims priority to French Patent Application No. 0853222, filed on May 19, 2008.

BACKGROUND OF THE INVENTION

The present invention relates to glazing provided with thin-film multilayer coatings that act on solar radiation, especially glazing intended for thermal insulation and/or solar protection.

The invention also relates to this type of glazing once opacified so as to form part of a building wall cladding panel, called "curtain walling", which makes it possible, in combination with window glazing, to provide external surfaces of buildings entirely made from glass.

This type of glazing has been used for many years in the building sector, on the one hand to improve the thermal insulation of buildings and, on the other hand, to limit the amount of solar radiation penetrating the building (i.e. to limit the greenhouse effect). The radiation of interest, then, is solar radiation comprising the light spectrum extending from UV rays (wavelength equal to about 290 nm) to the near infrared (wavelength equal to about 2500 nm) and to thermal infrared radiation (with a wavelength of between about 2500 nm and 50 microns).

A first solution consists in varying the composition of the glass so as to obtain the desired characteristics. However, this solution proves to be neither practical nor economic, since to modify the glass composition it is necessary beforehand to empty the glass manufacturing furnace, which is expensive and takes a great deal of time. It is therefore preferable to use the solution consisting in depositing one or more thin films on at least one of the faces of the glass. In a multilayer coating, at least two different types of layers may be distinguished: functional layers, which give the multilayer coating essentially all of its thermal properties, and protection layers, generally made of transparent dielectric materials, the main role of which is that of providing the functional layers with chemical and/or mechanical protection.

However, certain uses of the glass require particular grades of this material. Thus, in the architectural and automotive fields, it is desirable or even necessary to use toughened glass ("safety" glass), the toughening or toughening process giving the glass good mechanical strength. Unfortunately, the toughened glass cannot be cut and it is therefore necessary for the glass to have its final shape and dimensions before the toughening or toughening process. Since the toughening of the glass is carried out by heating the glass to a high temperature (close to 700° C.) and then rapidly lowering the temperature (thereby creating mechanical stresses within the glass), thin layers deposited on the glass before the toughening or toughening process generally cannot withstand such a treatment and lose their optical and/or thermal properties. Moreover, the solution consisting in depositing thin films on the already toughened glass poses logistic problems and is not industrially viable.

Another property often required of the glass is to be able to withstand a heat treatment so as to be worked, in order to give it a curved or bent shape—the glass is then referred to as being "bendable".

One technical problem to be solved is therefore that of developing a thin-film multilayer coating whose properties are not degraded when the glass on which it has been deposited is toughened and/or bent. In other words, the thin-film multilayer coating must be "toughenable" and "bendable". The properties of the thin films that must not be degraded are in particular the solar radiation filtration performance and the optical characteristics, such as colors and light transmission intensity.

Solutions have already been proposed in the form of relatively simple multilayer coatings. Thus, an example of architectural solar-protection glazing is given in patents EP 0 511 901 and EP 0 678 483: this involves functional layers, for solar radiation filtration, layers made of a nickel-chromium alloy, optionally nitrided, or made of stainless steel or made of tantalum, and these are placed between two layers of dielectric made of a metal oxide, such as $SnO_2$, $TiO_2$ or $Ta_2O_5$. However, such glazing is not truly "bendable" or "toughenable" since the oxide layers surrounding the functional layer cannot prevent its oxidation during bending or toughening, oxidation being accompanied by a modification of the light transmission and the appearance of the glazing in its entirety.

More recently, patent application WO 01/21540 A1 has proposed a transparent substrate provided with a thin-film multilayer coating consisting of a functional layer made of metal (Nb, Ta, Zr) or made of a nitride of this metal, and an overlayer made of aluminum nitride or oxynitride and/or silicon nitride or oxynitride. This solution is relatively satisfactory since the multilayer coating is "bendable", "toughenable" and mechanically strong, and has good optical characteristics. However, if it is desired to reduce the light transmission $T_L$, it is necessary to increase the thickness of the functional layer, this having the drawback of increasing the light reflections, in particular inside the building. When it is dark outside (or at night), there is a tendency, inside the building, to now see only the thin-film multilayer coating, the glazing then taking on a relatively intense, and unattractive, color, dominant in the yellow/orange. In the CIE Lab model of color representation developed by the CIE (International Illumination Commission), these colors correspond to a* greater than 0 and b* very much greater than 0. The ideal in this model is to obtain values close to zero for the components a* and b*, resulting in less vivid colors, tending toward shades of gray (more neutral colors), and therefore more pleasant.

BRIEF SUMMARY OF THE INVENTION

The object of the present invention is therefore to develop novel thin-film multilayer coatings that act on solar radiation for the purpose of manufacturing improved solar protection glazing. The intended improvement is in particular a reduction in reflections and/or neutralization of the colors for a given light transmission value, while still maintaining the capability of withstanding heat treatments (for toughening and bending) without any damage when the substrate bearing the coating is of the glass type.

One subject of the invention is a transparent substrate having a glazing function, provided with a thin-film multilayer coating that acts on solar radiation.

According to the invention, the coating comprises at least two absorbent functional layers each flanked by two transparent layers comprising a dielectric material.

DETAILED DESCRIPTION OF THE INVENTION

Advantageously:
the functional layers are based on a metal belonging to the group consisting of: niobium, tantalum, zirconium and molybdenum, the preference being for niobium;
the metal of at least one of the functional layers is partially or entirely nitrided;
the substrate may comprise at least one alternation of a functional layer based on a nitrided metal and a functional layer based on a non-nitrided metal, or at least one alternation of a functional layer based on a non-nitrided metal and a functional layer based on a nitrided metal;
the dielectric material may be based on silicon nitride, which may or may not be doped with aluminum;
a sacrificial layer may be interposed between at least one of the functional layers and at least one of the dielectric layers that flank it, the sacrificial layer possibly being based on titanium or on nickel-chromium and its thickness possibly being of the order of a few nanometers, lying between 1 nm and 3 nm, or less than 1 nm;
at least one of the dielectric layers may be made up of an alternation of high-index and low-index layers, such as $Si_3N_4/SiO_2$ or $Si_3N_4/SiO_2/Si_3N_4$;
the sum of the thicknesses of the functional layers may be at most 50 nm and the thicknesses of the functional layers may be substantially the same;
the substrate may be toughenable, bendable and/or enamelable; and
the substrate may be made of clear or bulk-tinted glass, or made of a flexible or rigid transparent polymer material—the substrate may be at least partially opacified by a coat in the form of a lacquer or an enamel.

The invention also relates to monolithic glazing (i.e. consisting of a single substrate) or insulating multiple glazing of the double glazing type, incorporating the substrate as defined above. The thin-film multilayer coating is preferably on face 2, the faces of the substrates being numbered from the outside to the inside of the passenger compartment or the room which is equipped therewith, giving it a solar radiation protection effect. (Conventionally, face 1 of the substrate is turned toward the outside, and in the case of double glazing, face 3 constitutes the internal face of the second substrate facing face 2 of the first substrate, and face 4 then constitutes the external face of the second substrate).

Advantageously, the glazing may be predominantly blue/green, in particular with negative a* and b* values.

The invention also relates to a building wall cladding panel of the curtain walling type, incorporating the opacified substrate as defined above.

Other features and advantages of the invention will become apparent over the course of the following description of several embodiments of the invention, given by way of non-limiting examples.

Thus, the solution provided by the present invention consists of a thin-film multilayer coating comprising at least two absorbent functional layers each flanked by two layers of a transparent dielectric material.

Preferably:
the absorbent functional layers are made from a metal chosen from niobium (Nb), tantalum (Ta), molybdenum (Mo) and zirconium (Zr), or based on a nitride of one of these metals (MoN, NbN, TaN, ZrN), used by itself or in a mixture; and
the transparent dielectric material of the layers flanking the functional layers is preferably silicon nitride ($Si_3N_4$).

According to the invention, one embodiment of the multilayer coating may then be the following:
glass substrate/$Si_3N_4$/NbN/$Si_3N_4$/NbN/$Si_3N_4$;
glass substrate/$Si_3N_4$/NbN/$Si_3N_4$/Nb/$Si_3N_4$;
glass substrate/$Si_3N_4$/Nb/$Si_3N_4$/NbN/$Si_3N_4$.

It should be pointed out that each functional layer, Nb or NbN, is well flanked by two layers of a dielectric material ($Si_3N_4$ in the example given).

The functional layers of Mo, Nb, Ta or Zr type are particularly stable and may undergo various heat treatments without degrading their optical properties. Specifically, it has been demonstrated that, for example, niobium becomes partially nitrided during annealing, which will modify the optical behavior. Molybdenum has a tendency to be very easily oxidized and to become transparent. Functional layers of the nitride type, most particularly niobium nitride, also have a high level of chemical stability.

The functional layers must be absorbent, which means that they are absorbent in the visible range. In general, a thin film is said to be absorbent when it absorbs some of the light rays in the visible range.

The thicknesses of the NbN functional layers may each be of the order of 10 nm (the sum of the thicknesses of the two layers not exceeding 40 to 50 nm), whereas with the solution of the prior art described in patent WO 01/21540 A1, in which only a single functional layer is used (multilayer coating corresponding to $Si_3N_4$/NbN/$Si_3N_4$), its thickness is rather of the order of several tens of nm. The thicknesses of the functional layers may be adjusted according to the desired light transmission $T_L$ required of the coating.

Advantageously, the thin functional layers may be flanked by thin sacrificial layers, for example based on titanium. The sacrificial layers are therefore inserted between a functional layer and a dielectric layer. The purpose of a sacrificial layer is to protect the metallic character (in the untoughened state) of the Nb, Ta or Zr layer. One possible example is the following multilayer coating, with titanium (Ti) sacrificial layers: glass/$Si_3N_4$/Ti/Nb/Ti/$Si_3N_4$/Ti/Nb/Ti/$Si_3N_4$. The thickness of these sacrificial layers is of the order of a few nanometers, between 1 nm and 3 nm, or even less than 1 nm.

As a variant, the titanium may be replaced with nickel-chromium.

The thickness of the transparent dielectric layers may be chosen so as to adjust the colors of the coating, seen both from inside and from outside the building. For a given value of $T_L$, the use of a thin-film multilayer coating according to the invention makes it possible:
to significantly reduce the level of reflections; and
to make the colors in reflection more neutral (a* and b* in the Lab system tending toward 0) or even to obtain predominantly blue/green colors (a* and b* having negative values).

One or more transparent dielectric layers may be replaced with an alternation of high-index and low-index layers, such as for example $Si_3N_4/SiO_2$ or $Si_3N_4/SiO_2/Si_3N_4$.

Advantageously, the layers of the multilayer coating that are based on silicon nitride may also contain a metal in a minor proportion compared with silicon, for example aluminum, especially with a content of 5 to 10% by weight of the compound constituting the layer made of transparent dielectric material. This is useful for increasing the rate of deposition of the film by magnetron sputtering, i.e. magnetically enhanced sputtering, in which the silicon target when not doped is insufficiently conductive.

In addition, the metal may give the nitride better durability.

The examples given below illustrate various embodiments of the invention and allow the characteristics of the multilayer coatings obtained according to the prior art and according to the invention to be compared.

In the following examples, the layers were deposited by magnetically enhanced (magnetron) sputtering at room temperature on a glass substrate 4 mm in thickness.

In these examples:
- the optical transmission $T_L$ is the light transmission in % under illuminant $D_{65}$;
- the external reflection $R_{out}$ is the reflection in % measured on the glass side of the room or building, when the glass coated with the thin-film multilayer coating is mounted as monolithic glazing in a room with the multilayer coating on face 2 (using the conventional system of numbering the faces of a substrate, explained above);
- the internal reflection $R_{in}$ is the reflection in % measured on the coating side of the room or building, when the glass coated with the thin-film multilayer coating is mounted as monolithic glazing in a room with the multilayer coating on face 2; and
- a* and b* (external) or a* and b* (internal) are the colorimetric coordinates in external (or internal) reflection according to the (L, a*, b*) colorimetry model.

Comparative Example 1

| Coating | No. 1: one NbN layer | No. 2: two NbN layers |
|---|---|---|
| $T_L$ | 20% | 20% |
| $R_{in}$ | 26% | 8% |
| a*; b* (internal) | 2; 16 | −2; −3 |
| $R_{out}$ | 32% | 6% |
| a*; b* (external) | −1; −2 | −1; −3 |

In this comparative example, coating No. 1 is of the glass/$Si_3N_4$/NbN/$Si_3N_4$ type, corresponding to the prior art described in the patent application WO 01/21540 A1, the single NbN layer (functional layer) having a thickness of 25 nm. Coating No. 2 is of the glass/$Si_3N_4$/NbN/$Si_3N_4$/NbN/$Si_3N_4$ type in accordance with the present invention, the thickness of the first NbN functional layer being 10 nm and the thickness of the second NbN layer being 13 nm. The total thickness of the two NbN layers of coating No. 2 is therefore substantially identical to the thickness of the single layer of coating No. 1 (13+10 nm, compared with 25 nm). In the case of coating No. 2, the thickness of the first $Si_3N_4$ layer (the layer adjacent to the glass V) is between 30 and 50 nm, the thickness of the second $Si_3N_4$ layer is between 60 and 80 nm and the thickness of the third layer is between 30 and 50 nm.

It should be pointed out that, for the same light transmission $T_L$ (20%) and for similar NbN thicknesses, the reflection coefficients, both internal and external, of coating No. 2 are very much lower than those of coating No. 1. In addition, the a* and b* values on the side internal to the room are slightly negative. This produces a relatively neutral color (less yellow than with coating No. 1).

Comparative Example 2

This example relates to a multilayer coating of the type: glass/$Si_3N_4$/NbN/$Si_3N_4$/NbN/$Si_3N_4$.

The thicknesses (in nm) of the various layers are given in the following table:

| Layer | $Si_3N_4$ | NbN | $Si_3N_4$ | NbN | $Si_3N_4$ |
|---|---|---|---|---|---|
| Thickness (in nm) | 40 | 8 | 80 | 13 | 35 |

For a light transmission $T_L$ of the order of 20%, the following results were obtained:
$T_L$=21%;
$R_{out}$=9.0; a*=−2.5; b*=−18.1 (glass side); and
$R_{in}$=16.9; a*=−4.8; b*=0.7 (coating side).

$R_{out}$ is the reflection coefficient of the coating seen from the glass side and the a* and b* values correspond to the colors seen from the glass side, whereas $R_{in}$ and the corresponding a* and b* values are values when looking at the multilayer coating from the coatings side. The use of an NbN bilayer coating enables low coating-side and glass-side reflection values to be obtained and also a very pronounced blue color on the glass side and a slightly green color on the coating side.

The counter-example below relates to two coatings having a single functional layer of the type of the prior art: glass/$Si_3N_4$/NbN/$Si_3N_4$. Two series of different thicknesses (in nm) are given in the table below.

| Layer | $Si_3N_4$ | NbN | $Si_3N_4$ | |
|---|---|---|---|---|
| Thickness 1 | 85 | 27 | 30 | $T_L$ = 21% $R_{out}$ = 22.6; a* = −4.6; b* = −14.4 $R_{in}$ = 20.5; a* = 7.0; b* = 25.8 |
| Thickness 2 | 110 | 22 | 15 | $T_L$ = 21% $R_{out}$ = 21.2; a* = −6.5; b* = −7.6 $R_{in}$ = 31.2; a* = 3.4; b* = 2.2 |

It should be pointed out that, for the same light transmission value $T_L$, the use of a coating with a single NbN functional layer does not make it possible to obtain light reflection values this low and/or neutral and/or blue/green colors on the coating side.

Comparative Example 3

For some applications, it may be beneficial to add a sacrificial layer interposed between a functional layer and a dielectric layer. A sacrificial layer is intended to protect the metallic character (in the nontoughened state) of the functional layer. Advantageously, this sacrificial layer may be based on titanium with a relatively small thickness (generally ≦1 nm).

This example relates to two multilayer coatings provided with titanium sacrificial layers flanking the niobium functional layer or layers, one (No. 1) according to the prior art:
glass/$Si_3N_4$/Ti/Nb/Ti/$Si_3N_4$
and the other (No. 2) according to the present invention:
glass/$Si_3N_4$/Ti/Nb/Ti/$Si_3N_4$/Ti/Nb/Ti/$Si_3N_4$.

| Coating | No. 1 | No. 2 |
|---|---|---|
| $T_L$ | 20% | 20% |
| $R_{in}$ | 41% | 14% |

-continued

| Coating | No. 1 | No. 2 |
|---|---|---|
| a* (internal) | 1 | 0 |
| b* (internal) | 17 | −9 |
| $R_{out}$ | 28% | 13% |
| a* (external) | 0 | 2 |
| b* (external) | 8 | −2 |
| ϵ (emissivity) | 5-10% | 15-20% |

The thickness of the Nb layer for coating No. 1 is 30 nm, slightly greater than the sum (20 nm) of the thicknesses of the two Nb layers of coating No. 2.

It should be pointed out that, for the same light transmission coefficient $T_L$, the coating No. 2 with two functional layers is much less reflective than coating No. 1 having a single functional layer, both toward the inside ($R_{in}$), where the gain is about 30%, and toward the outside ($R_{out}$). In addition, with b* values for the inside going from 17 to −9, the glazing switches from a yellow color to a much more pleasant blue color. The values obtained for the emissivity c show that the coating retains its relatively low-E character (the emissivity is the capacity to reflect a very large portion of thermal infrared radiation having wavelengths between 3 and 50 microns).

It should be pointed out that with coating No. 2 integrated into double glazing of the 6 mm/4 mm type, the glazing panes being separated by an argon layer 15 mm in thickness, a U factor of 1.5 W/m²·K is obtained, which value is to be compared with the same type of glazing (with no coating No. 2), for which a U value of 2.6 W/m²·K is obtained.

Given below is another multilayer coating structure according to the invention (a hybrid NbN/Nb structure).

Example 3 glass/$Si_3N_4$ (40)/NbN(8)/$Si_3N_4$ (65)/Ti (1)/Nb(8)/Ti (1)/$Si_3N_4$(35),
which is compared with Example 4 (prior art) for which the $T_L$ and a*$_{out}$, b*$_{out}$ and $R_{out}$ data are generally similar, namely:
glass/$Si_3N_4$ (80)/Nb (23)/$Si_3N_4$ (28).

| Coating | No. 3 | No. 4 |
|---|---|---|
| $T_L$ | 20% | 21% |
| $R_{in}$ | 12.4% | 28% |
| a* (internal) | −0.3 | −11.3 |
| b* (internal) | −0.7 | −11.2 |
| $R_{out}$ | 6.6% | 22.3% |
| a* (external) | −1.3 | −3.6 |
| b* (external) | −17.9 | −15.3 |

As can be seen, the coating according to Example 3, compared with that of Example 4, sees its $R_{in}$ value singularly improved, as are its internal optical parameters (a*, b*) (neutral in reflection).

As a variant, a hybrid Nb/NbN coating structure is also possible.

A multilayer coating according to the present invention is bendable and/or toughenable and/or enamelable. A "bendable" or "toughenable" coating should be understood within the context of the invention to mean a coating which, when deposited on a substrate, undergoes a limited optical change which may in particular be quantified, within the CIE Lab color representation model (L, a*, b*), by a ΔE value of less than 3, especially less than 2, where ΔE is defined as follows:

$$\Delta E = (\Delta L^2 + \Delta a^2 + \Delta b^2),$$

in which ΔL, Δa and Δb are the differences in the measured L, a* and b* measurements before and after heat treatment.

A multilayer coating according to the present invention may optionally undergo an enameling treatment, this being particularly beneficial in the case of curtain walling. The enameling makes it possible to opacify glazing in the form of curtain walling. The multilayer coating according to the invention is enamelable in the sense that it is possible to deposit thereon an enamel and to bake it without appreciably modifying its optical appearance compared with window glazing provided with the same multilayer coating, in external reflection. The coating, on which an enamel composition may be deposited in a known manner, is said to be "enamelable" if no optical defects appear in the coating and there is only a limited optical change, which may be quantified as above. This also means that it has a satisfactory durability, without the layers of the coating in contact with the enamel suffering an annoying deterioration, either while the enamel is being baked or over the course of time once the glazing has been mounted.

A multilayer coating according to the invention is beneficial when clear or bulk-tinted glass substrates are used. However, it is equally possible not to seek to exploit its bendable or toughenable character but simply its satisfactory durability, using both glass and non-glass substrates, especially those made of a rigid transparent polymer material such as polycarbonate or polymethyl methacrylate (PMMA) as glass substitute, or else a flexible polymer material, such as certain polyurethanes or such as polyethylene terephthalate (PET), which flexible material may then be joined to a rigid substrate so as to functionalize it, making them adhere by various means, or using a lamination operation.

The present invention makes it possible to obtain solar controlled glazing that has low reflection values and also colors drawing on blue or green that cannot be easily attained with coatings having a single functional layer.

Embodiments other than those described and shown may be designed by a person skilled in the art without departing from the scope of the present invention.

The invention claimed is:

1. A transparent substrate, comprising a thin-film multilayer coating that comprises, in sandwiched form,
   at least two absorbent functional layers, each comprising at least one metal selected from the group consisting of niobium, tantalum, molybdenum, and zirconium;
   at least three transparent dielectric layers; and
   optionally at least one sacrificial layer,
   wherein
   each absorbent functional layer is flanked by and in direct contact with two of the transparent dielectric layers, or
   each sacrificial layer is present between and in direct contact with an absorbent functional layer and a transparent dielectric layer.

2. The transparent substrate of claim 1, wherein each functional layer comprises niobium.

3. The transparent substrate of claim 1, wherein the metal of at least one of the functional layers is partially or entirely nitrided.

4. The transparent substrate of claim 3, wherein the metal of each functional layer is nitrided.

5. The transparent substrate of claim 3, comprising:
   at least one alternation of a functional layer comprising a nitrided metal and a functional layer comprising a non-nitrided metal; or
   at least one alternation of a functional layer comprising a non-nitrided metal and a functional layer comprising a nitrided metal.

6. The transparent substrate of claim 1, wherein each dielectric layer comprises silicon nitride.

7. The transparent substrate of claim 6, wherein said silicon nitride is doped with aluminum.

8. The transparent substrate of claim 7, wherein the aluminum is present in the silicon nitride in a proportion of 5 to 10% by weight.

9. The transparent substrate of claim 1, wherein a sacrificial layer is present between at least one of the functional layers and at least one of the dielectric layers that flank it.

10. The transparent substrate of claim 9, wherein the sacrificial layer comprises titanium or on nickel-chromium.

11. The transparent substrate of claim 9, wherein a thickness of the sacrificial layer is between 1 nm and 3 nm.

12. The transparent substrate of claim 1, wherein at least one of the dielectric layers comprises an alternation of high-index and low-index layers.

13. The transparent substrate of claim 1, wherein a sum of thicknesses of the functional layers is at most 50 nm.

14. The transparent substrate of claim 1, wherein the thicknesses of each functional layer is substantially the same.

15. The transparent substrate of claim 1, which is tough-enable, bendable, enamelable, or a combination thereof.

16. The transparent substrate of claim 1, further comprising:
   clear or bulk-tinted glass, or
   a flexible or rigid transparent polymer material.

17. The transparent substrate of claim 1, which is at least partially opacified by a coat in the form of a lacquer or an enamel.

18. A glazing, comprising a transparent substrate according to claim 1,
wherein
   a sum of thicknesses of the functional layers is at most 50 nm,
   the thicknesses of the functional layers are substantially the same, and
   the glazing exhibits a blue/green color.

19. The glazing of claim 18,
   wherein each a* and b* of the Lab system for the glazing is a negative value, thereby imparting a blue/green color to the glazing.

20. The transparent substrate of claim 1, wherein each transparent dielectric layer comprises silicon.

21. The transparent substrate of claim 1, wherein a sacrificial layer is present between an absorbent functional layer and a transparent dielectric layer.

22. The transparent substrate of claim 1, which has an arrangement selected from the group consisting of:
   glass substrate/$Si_3N_4$/NbN/$Si_3N_4$/NbN/$Si_3N_4$,
   glass substrate/$Si_3N_4$/NbN/$Si_3N_4$/Nb/$Si_3N_4$,
   glass substrate/$Si_3N_4$/Nb/$Si_3N_4$/NbN/$Si_3N_4$, and
   glass/$Si_3N_4$/Ti/Nb/Ti/$Si_3N_4$/Ti/Nb/Ti/$Si_3N_4$.

23. A building wall cladding panel of curtain walling, comprising the glazing of claim 17.

* * * * *